United States Patent
Atwood et al.

(10) Patent No.: US 9,751,263 B2
(45) Date of Patent: Sep. 5, 2017

(54) INJECTION MOLDING TO FINISH PARTS PRINTED WITH A THREE-DIMENSIONAL OBJECT PRINTER

(71) Applicant: Xerox Corporation, Norwalk, CT (US)

(72) Inventors: Christopher D. Atwood, Webster, NY (US); Mark A. Adiletta, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 302 days.

(21) Appl. No.: 14/690,780

(22) Filed: Apr. 20, 2015

(65) Prior Publication Data

US 2016/0303794 A1 Oct. 20, 2016

(51) Int. Cl.
| | | |
|---|---|---|
| *B29C 69/02* | (2006.01) | |
| *B29C 45/14* | (2006.01) | |
| *B29C 67/00* | (2017.01) | |
| *B29C 70/78* | (2006.01) | |
| *B33Y 40/00* | (2015.01) | |

(52) U.S. Cl.
CPC ........ *B29C 69/02* (2013.01); *B29C 45/14336* (2013.01); *B29C 67/0059* (2013.01); *B29C 70/78* (2013.01); *B29C 45/14008* (2013.01); *B29K 2995/0021* (2013.01); *B33Y 40/00* (2014.12)

(58) Field of Classification Search
CPC .... B29C 45/14008; B29C 69/02; B33Y 40/00
See application file for complete search history.

(56) References Cited

U.S. PATENT DOCUMENTS

| | | | | |
|---|---|---|---|---|
| 5,976,339 A | * | 11/1999 | Andre, Sr. | ............ C25D 1/003 205/67 |
| 6,887,407 B2 | * | 5/2005 | Okamoto | ............... B29C 45/14 264/266 |
| 6,998,089 B2 | * | 2/2006 | Osaki | ................. B29C 33/3842 249/134 |
| 7,604,768 B2 | * | 10/2009 | Kritchman | ............. B29C 41/48 264/308 |
| 9,573,024 B2 | * | 2/2017 | Bender | ................. A63B 45/00 |
| 2013/0234370 A1 | * | 9/2013 | Suzuki | ............... B29C 67/0059 264/401 |

(Continued)

FOREIGN PATENT DOCUMENTS

| | | |
|---|---|---|
| WO | 2010/071445 A1 | 6/2010 |
| WO | 2014/005591 A1 | 1/2014 |

*Primary Examiner* — Robert B Davis
(74) *Attorney, Agent, or Firm* — Maginot Moore & Beck LLP

(57) ABSTRACT

A method for forming a three-dimensional object uses a three-dimensional object printer to form a printed part and an injection molding system is used to form a molded part that adjoins the printed part and completes the three-dimensional object formation. The method includes operating an ejector head of a three-dimensional object printer to eject drops of material onto a platen to form the printed part, operating an actuator to move the printed part from the platen to a cavity of an injection mold of an injection molding system, and operating injectors of the injection molding system to inject material into the cavity of the injection mold to form the molded part that adjoins the printed part to form the three-dimensional object.

8 Claims, 7 Drawing Sheets

(56) References Cited

U.S. PATENT DOCUMENTS

2014/0203479 A1* 7/2014 Teken ................ B29C 67/0055
264/401
2014/0309764 A1* 10/2014 Socha-Leialoha ....... H04N 5/33
700/119
2015/0064015 A1 3/2015 Perez

* cited by examiner

INJECTION MOLDING TO FINISH PARTS PRINTED WITH A THREE-DIMENSIONAL OBJECT PRINTER

TECHNICAL FIELD

The device and method disclosed in this document relates to three-dimensional object manufacturing and, more particularly, to digital additive manufacturing and injection molding.

BACKGROUND

Digital three-dimensional object manufacturing, also known as digital additive manufacturing, is a process of making a three-dimensional solid object of virtually any shape from a digital model. Three-dimensional object printing is an additive process in which one or more ejector heads eject successive layers of material on a substrate in different shapes. The substrate is supported either on a platform that can be moved three dimensionally by operation of actuators operatively connected to the platform, or the ejector heads are operatively connected to one or more actuators for controlled movement of the ejector heads to produce the layers that form the object. Three-dimensional object printing is distinguishable from traditional object-forming techniques, which mostly rely on the removal of material from a work piece by a subtractive process, such as cutting or drilling. Manufacturing of three-dimensional printed parts using these techniques is ideal for producing small quantities of small and detailed parts. However, for large scale production of large parts, these techniques can be slower and more expensive than many traditional manufacturing techniques, such as injection molding.

Injection molding is a method of manufacturing three-dimensional objects in which molten material is injected into a mold and allowed to cool to form the object. When the material has cooled, the mold is opened to release the formed object. The mold can then be closed and another injection cycle performed to produce another object. Consequently, injection molding techniques are ideal for large numbers of relatively simple parts.

Being able to obtain the high speed and increased throughput available with injection molding techniques in the manufacture of three-dimensional objects with digital additive manufacturing techniques would be beneficial.

SUMMARY

A method for finishing a three-dimensional printed part using injection molding includes the steps of: operating an ejector head of a three-dimensional object printer to eject drops of material onto a platen to form a printed part; operating an actuator to move the printed part from the platen to a cavity of an injection mold of an injection molding system, the cavity being configured to shape a three-dimensional object; operating another actuator to close the injection mold; operating at least one injector of the injection molding system to inject material into the cavity of the injection mold to form a molded part in the cavity, the molded part being adjoined with the printed part to form the three-dimensional object within the cavity of the injection mold; and operating the other actuator to open the injection mold and release the three-dimensional object from the cavity of the injection mold.

A method for finishing a three-dimensional printed part using injection molding includes the steps of: operating a three-dimensional object printer to form a first portion of a three-dimensional object; and operating an injection molding system to mold a second portion of the three-dimensional object onto the first portion of the three-dimensional object, the first portion and the second portion being adjoined to form the three-dimensional object.

A system for finishing a three-dimensional printed part using injection molding includes a three-dimensional object printer having platen and an ejector head configured to eject drops of material onto the platen to form a printed part on the platen; an injection molding system having an injection mold with a cavity configured to shape a three-dimensional object and injectors configured to inject material into the cavity; an actuator configured to move the printed part from the three-dimensional object printer to the cavity of the injection mold; and a controller operably connected to the three-dimensional object printer, the injection mold, and the actuator, the controller being configured to: operate the ejector head to eject drops of material onto a platen to form the printed part on the platen; operate the actuator to move the printed part from the platen to the cavity of an injection mold; and operate the injectors to inject material into the cavity of the injection mold to form a molded part in the cavity, the molded part being adjoined with the printed part to form the three-dimensional object.

BRIEF DESCRIPTION OF THE DRAWINGS

The foregoing aspects and other features of a system and method that incorporates aspects of injection molding in digital additive manufacturing are explained in the following description, taken in connection with the accompanying drawings.

DETAILED DESCRIPTION

Figure 1:
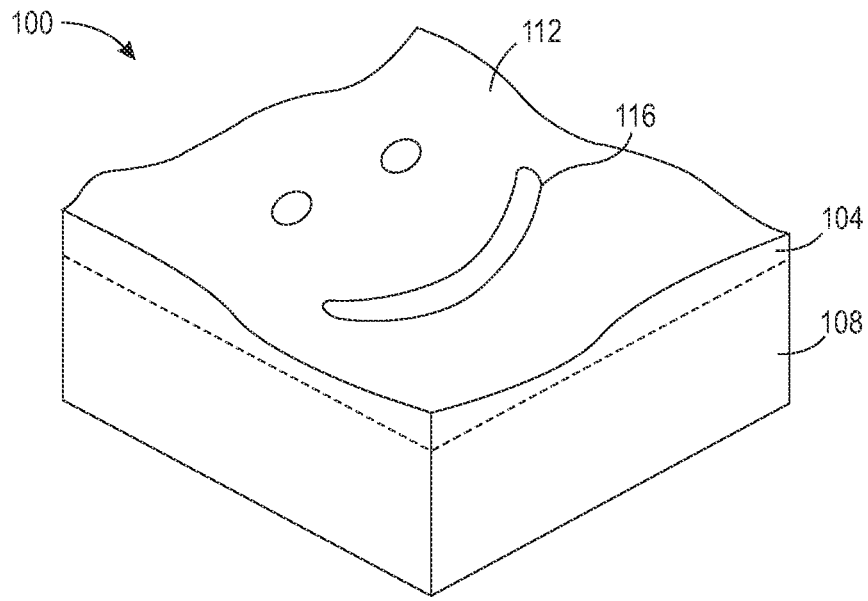
FIG. 1 shows a three-dimensional object manufactured according to the disclosure.
Figure 2:
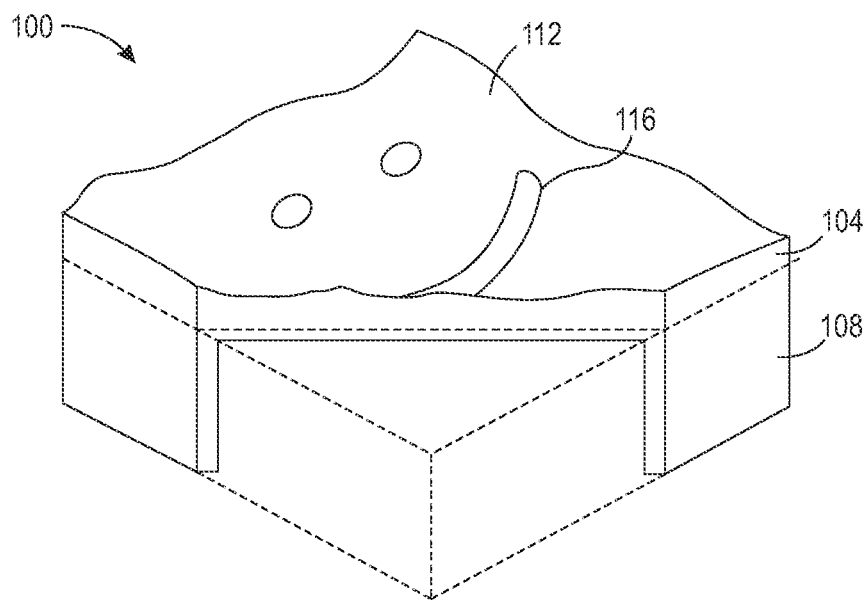
FIG. 2 shows a cutaway view of the three-dimensional object of FIG. 1.

For a general understanding of the environment for the method and system disclosed herein as well as the details for the method and system, reference is made to the drawings. In the drawings, like reference numerals designate like elements FIG. 1 shows a three-dimensional object 100 manufactured according to the disclosure. The object 100 has a printed portion 104 and a molded portion 108. The printed portion 104 is printed with a three-dimensional object printer. The molded portion 108 is formed directly onto the printed portion 104 using an injection molding system. In some embodiments the printed portion 104 has at least one contoured surface 112. In some embodiments, the printed portion 104 includes an image 116 on at least one surface. FIG. 2 shows a cut away view of the object 100.

Figure 3:
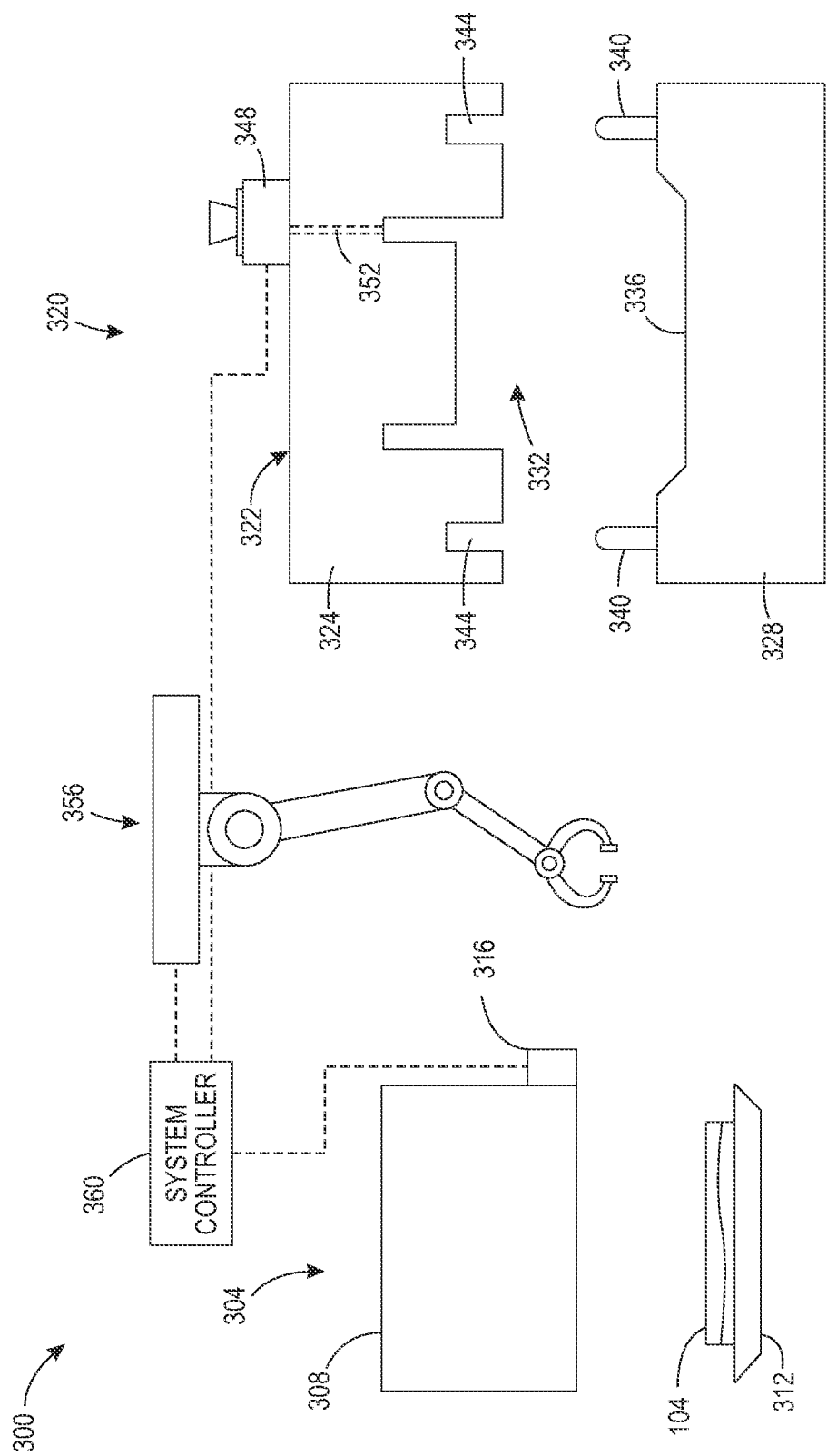
FIG. 3 shows a system for finishing a three-dimensional printed part using injection molding.

FIG. 3 shows a system 300 for finishing a three-dimensional printed part using injection molding. The system 300 includes a three-dimensional object printer 304. The printer 304 includes an ejector head 308 configured to eject drops of material onto a platen 312 to form a three-dimensional object, such as the printed portion 104 of the object 100. In some embodiments, the ejector head includes a first plurality of ejectors configured to eject drops of a support material onto the platen 312 and a second plurality of ejectors configured to eject drops of build material onto the platen 312. In further embodiments, the second plurality of ejectors of the ejector head is configured to eject drops of build materials of multiple colors. The printer 304 further includes a controller 316 configured to operate ejectors in the ejector head 308 to eject drops of material towards the platen 312 to form layers of material with reference to digital image data of a three-dimensional object to be printed. In some embodiments, the digital image data contains color data and the controller 316 operates the ejector head 308 to form multi-colored objects and objects with images on a surface.

The system 300 includes an injection molding system 320 configured to finish an object by molding a portion directly onto a printed portion of the object. In the embodiment depicted in FIG. 3, the injection molding system 320 is configured to mold the molded portion 108 directly onto the printed portion 104 to form the object 100. In some embodiments, the injection molding system 320 includes an injection mold 322 having an upper portion 324 and a lower portion 328. The upper portion 324 and the lower portion 328 are configured to be separable from each other to allow the printed portion 104 to be placed inside a cavity 332, which is configured to shape the object 100. In one embodiment, the lower portion 328 includes a recess 336 disposed adjacent to the cavity 332 that is configured to receive the platen 312 so the printed portion 104 is within the cavity when the platen 312 is placed into the recess. In some embodiments, the upper portion 324 is fixed in place and the lower portion 328 is configured to move to interlock with the upper portion 324. In some embodiments, the lower portion 328 has protrusions 340 that correspond to holes 344 of the upper portion 324. The protrusions 340 interlock with the holes 344 to ensure that the lower portion 328 properly aligns with the upper portion 324 when brought together. When the injection mold 322 is closed, an injector 348 of the injection molding system 320 is operated to inject molten material into the cavity 332 via at least one sprue 352.

In some embodiments, a system controller 360 is provided for operating the printer 304, the injection mold 320, and an actuator 356. The system controller 360 is operatively connected to each of the controller 316 of printer 304, the injection mold 320, and the actuator 356 and is configured to send commands to control the operations of each of these components. The actuator 356 is configured to move the platen 312 between the three-dimensional object printer 304 and the injection molding system 320. In FIG. 3, the actuator 356 is depicted as a robotic arm, but the actuator 356 may comprise any mechanism suitable for moving the platen 312 from the printer 304 and placing the platen 312 into the injection mold 320.

Figure 4:
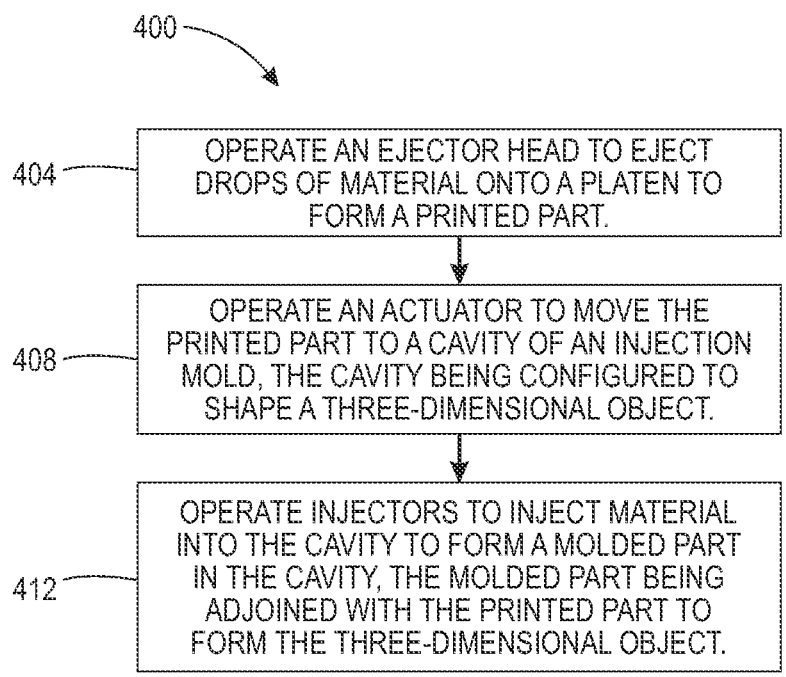
FIG. 4 shows a method for finishing a three-dimensional printed part using injection molding.

A method 400 for finishing a three-dimensional printed part using injection molding is shown in FIG. 4. In the description of this process, statements that the process is performing some task or function refers to a controller or general purpose processor executing programmed instructions stored in a memory operatively connected to the controller or processor to manipulate data or to operate one or more components in the printer to perform the task or function. The controller 360 noted above can be such a controller or processor. Alternatively, the controller 360 can be implemented with more than one processor and associated circuitry and components, each of which is configured to form one or more tasks or functions described herein.

Figure 5:
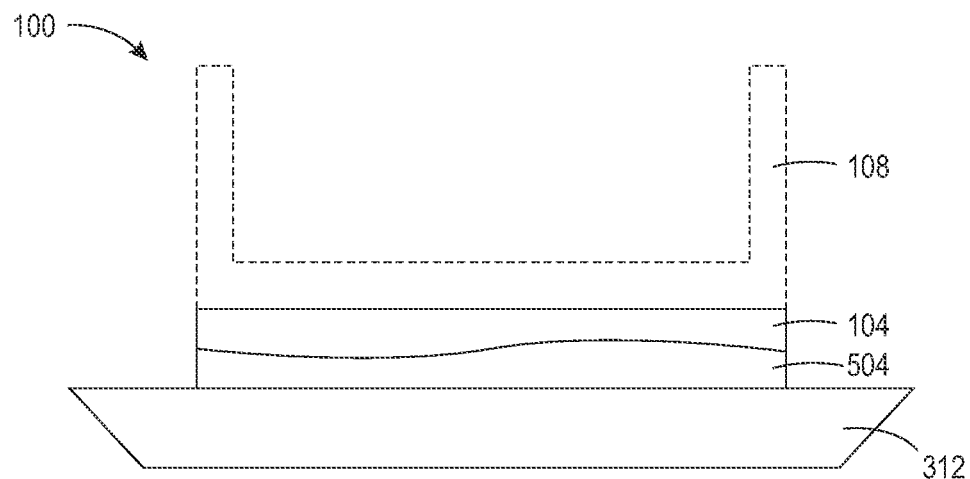
FIG. 5 shows a platen having a printed portion of the object of FIG. 1 printed thereon.

When the method 400 is performed, it begins by operating an ejector head to eject drops of material onto a platen to form a printed part (block 404). The system controller 360 sends commands to the controller 316 of the three-dimensional object printer 304 to operate ejectors of the ejector head 308 to eject drops of material onto the platen 312 to form the printed portion 104 of the object 100. As shown in FIG. 5, in one embodiment, the controller 316 first operates the first plurality of ejectors of the ejector head 308 to eject drops of support material to form a support layer 504. Next, the controller 316 operates the second plurality of ejectors of the ejector head 308 to eject drops of build material to form the printed portion 104 of the object 100. In one embodiment, the controller 316 operates the ejector head 308 to form the printed portion with a contoured surface that abuts the support layer 504. In another embodiment, the controller 316 operates the ejector head 308 to eject build material of multiple colors to form the printed portion 104 with an image on at least one surface. FIG. 5 further shows a dotted outline of the molded portion 108 of the object 100, which has not yet been formed.

Figure 6:
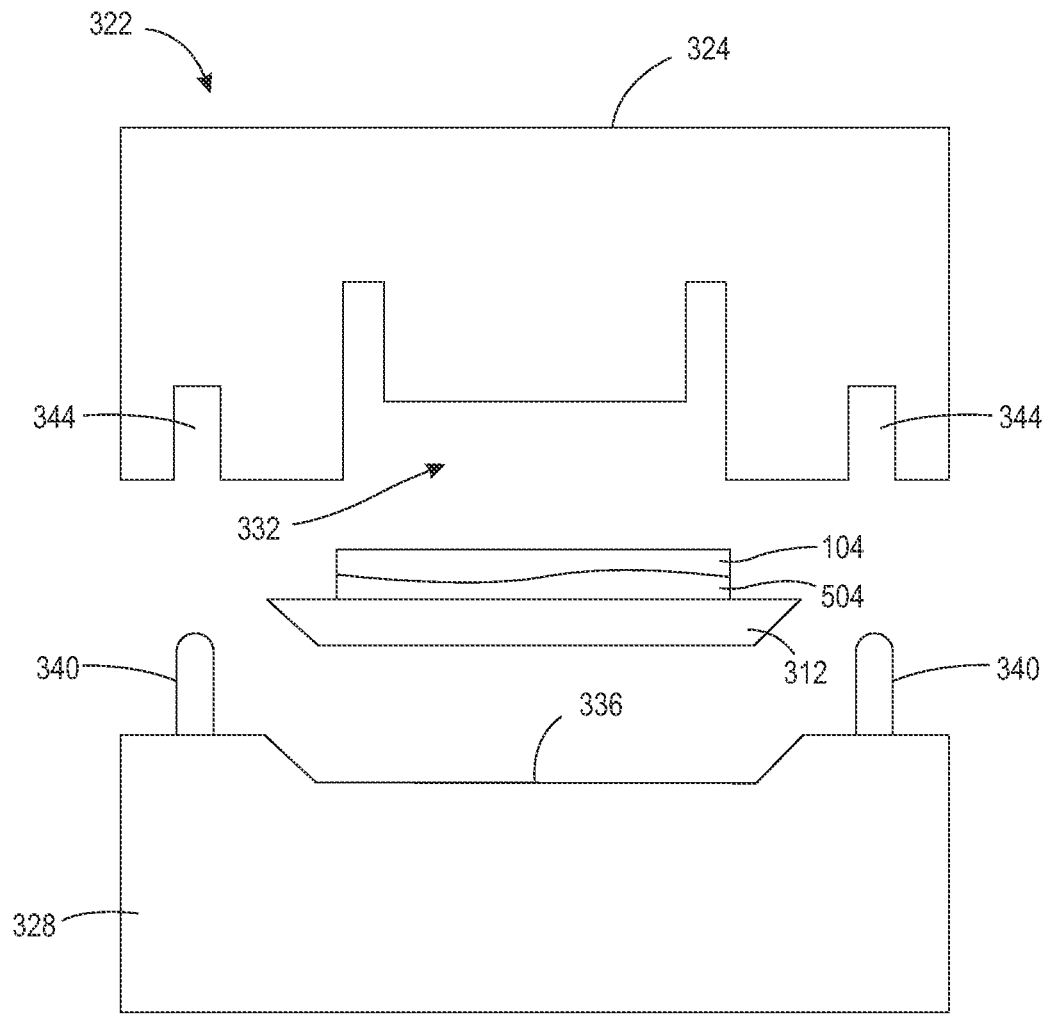
FIG. 6 shows the platen being positioned within a cavity of an injection mold.
Figure 7:
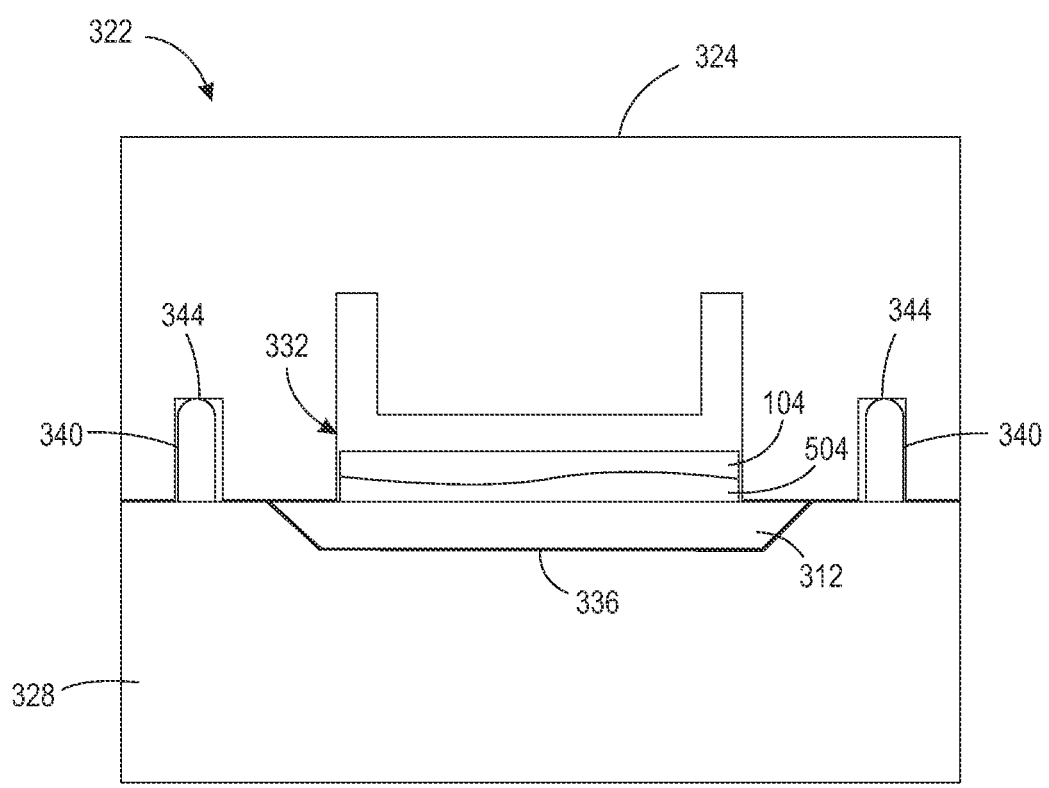
FIG. 7 shows the injection mold in a closed position and having the platen positioned with the cavity of the injection mold.

Next, the method 400 operates an actuator to move the printed part to a cavity of an injection mold, the cavity being configured to shape a three-dimensional object (block 408). The system controller 360 operates the actuator 356 to move the printed portion 104 from the three-dimensional object printer 304 into the cavity 332 injection mold 320. As shown in FIG. 6, in one embodiment, the system controller 360 operates the actuator to remove the platen 312 with the printed part 104 on the platen 312 from the printer 304. The actuator moves platen 312 with the printed part 104 into the cavity 332 of the injection mold and places the platen 104 into the recess 336. As shown in FIG. 7, after the platen 104 is positioned in the recess 336, the system controller 360 operates the injection molding system 320 to move the injection mold 322 to a closed position.

Figure 8:
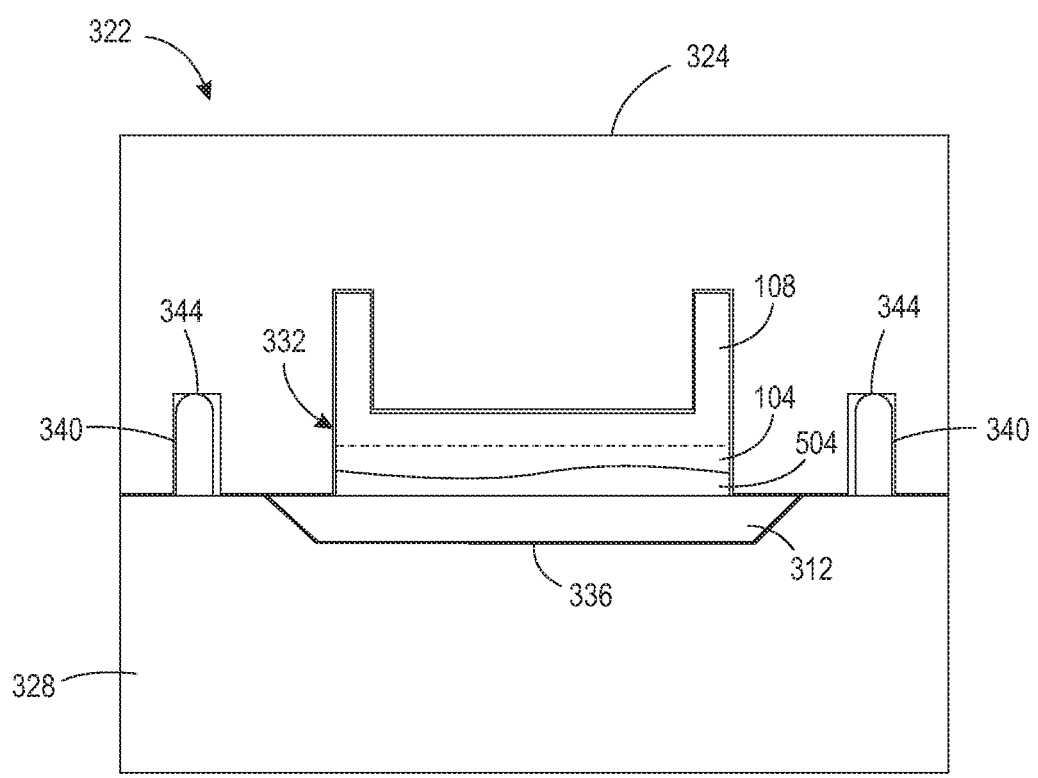
FIG. 8 shows the injection mold with the molded portion of the object of FIG. 1 formed within the cavity of the injection mold.
Figure 9:
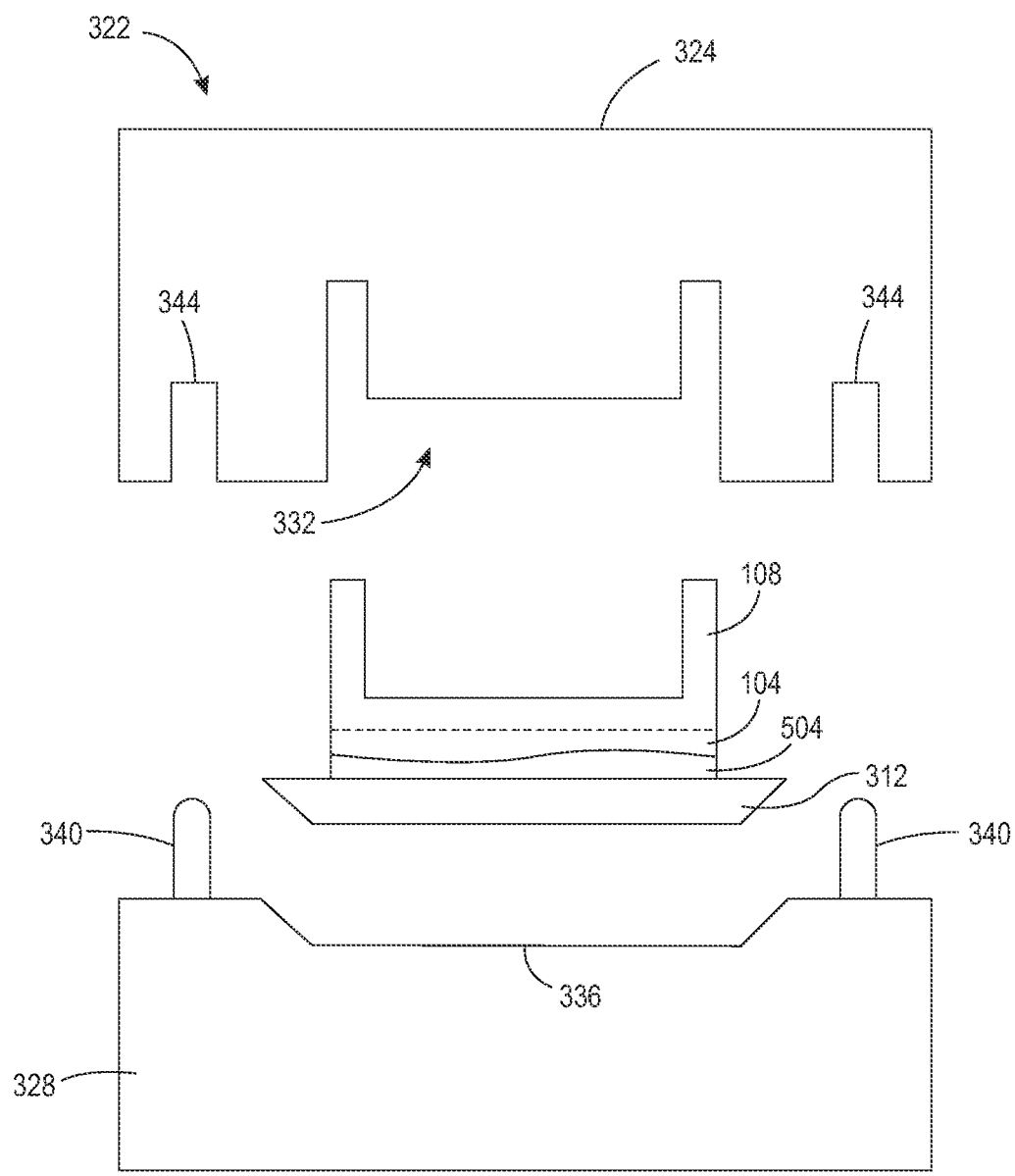
FIG. 9 shows the injection mold in an open position to release the formed object of FIG. 1.

Next, the method 400 operates injectors to inject material into the cavity to form a molded part in the cavity, the molded part being adjoined with the printed part to form the three-dimensional object (block 412). The system controller 360 operates the injector 348 to inject molten material into the cavity 332 via the sprue 352. As shown in FIG. 8, the material cools to form the molded portion 108 of the object 100. The molded portion 108 joins with the printed portion 104 to form the entirety of the object 100. As shown in FIG. 9, after the object 100 has been formed and cooled, the system controller 360 operates the injection molding system 320 to move the injection mold 322 to an open position to release the object 100. In some embodiments, the system controller 360 operates the actuator 356 to remove the platen 104 and the finished object 100 from the injection mold 322. By forming the more intricate features of the object 100 with the three-dimensional object printer and the simpler features with the injection molding, the time to produce the object 100 is reduced over the time required to form the entire object with the printer. Additionally, the process is more flexible since indicia on the printed portion 104, such as the image 116, can be produced by the printer so they change from object to object, while the common features to all of the formed objects are made with the injection molding system.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A system for manufacturing a three-dimensional object comprising:
    a three-dimensional object printer having a platen and an ejector head, which is configured to eject drops of material onto the platen to form a printed part on the platen;
    an injection molding system having an injection mold with a cavity configured to shape a three-dimensional object and injectors configured to inject material into the cavity, the injection mold also including a recess adjacent to the cavity configured to receive the platen and place the printed part within the cavity;
    an actuator configured to move the printed part from the three-dimensional object printer to the cavity of the injection mold; and
    a controller operably connected to the three-dimensional object printer, the injection mold, and the actuator, the controller being configured to:
        operate the ejector head to eject drops of material onto a platen to form the printed part on the platen;
        operate the actuator to move the platen and the printed part on the platen into the recess of the injection mold to enable the printed part to be in the cavity of an injection mold; and
        operate the injectors to inject material into the cavity of the injection mold to form a molded part in the cavity, the molded part being adjoined with the printed part to form the three-dimensional object.

2. The system of claim 1, the controller being further configured to:
    operate the ejector head to eject drops of a support material onto the platen to form a support layer; and
    operate the ejector head to eject drops of a build material onto the support layer to form the printed part.

3. The system of claim 2, the controller being further configured to:
    operate the ejector head to eject the drops of build material to form the printed part with at least one contoured surface that abuts the support material.

4. The system of claim 1, the controller being further configured to:
    operate the ejector head to eject drops of a first build material and drops of a second build material onto the platen to form the printed part, the first build material being a different color than the second build material, the first build material of the printed part and the second building material of the printed part being arranged within the printed part to form an image on a surface of the printed part.

5. A system for manufacturing a three-dimensional object comprising:
    a three-dimensional object printer having a platen and an ejector head, which is configured to eject drops of material onto the platen to form a printed part on the platen;
    an injection molding system having an injection mold with a cavity configured to shape a three-dimensional object and injectors configured to inject material into the cavity;
    an actuator configured to move the printed part from the three-dimensional object printer to the cavity of the injection mold; and
    a controller operably connected to the three-dimensional object printer, the injection mold, and the actuator, the controller being configured to:
        operate the ejector head to eject drops of material onto a platen to form the printed part on the platen;
        operate the actuator to move the printed part on the platen to the cavity of an injection mold; and
        operate the injectors to inject material into the cavity of the injection mold to form a molded part in the cavity, the molded part being adjoined with the printed part to form the three-dimensional object; and,
        operate the actuator to remove the platen and the formed three-dimensional object on the platen from injection mold after the injectors have been operated to form the molded part.

6. The system of claim 5, the controller being further configured to:
    operate the ejector head to eject drops of a support material onto the platen to form a support layer; and
    operate the ejector head to eject drops of a build material onto the support layer to form the printed part.

7. The system of claim 6, the controller being further configured to:
    operate the ejector head to eject the drops of build material to form the printed part with at least one contoured surface that abuts the support material.

8. The system of claim 5, the controller being further configured to:
    operate the ejector head to eject drops of a first build material and drops of a second build material onto the platen to form the printed part, the first build material being a different color than the second build material, the first build material of the printed part and the second building material of the printed part being arranged within the printed part to form an image on a surface of the printed part.

* * * * *